United States Patent
Li et al.

(10) Patent No.: US 9,178,900 B1
(45) Date of Patent: Nov. 3, 2015

(54) DETECTION OF ADVANCED PERSISTENT THREAT HAVING EVASION TECHNOLOGY

(71) Applicants: Yuefeng Li, Nanjing (CN); Qiang Huang, Nanjing (CN); Ben Huang, Nanjing (CN)

(72) Inventors: Yuefeng Li, Nanjing (CN); Qiang Huang, Nanjing (CN); Ben Huang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 135 days.

(21) Appl. No.: 14/085,546

(22) Filed: Nov. 20, 2013

(51) Int. Cl.
  *G06F 11/00* (2006.01)
  *H04L 29/06* (2006.01)
  *G06F 9/455* (2006.01)
  *G06F 21/55* (2013.01)
  *G06F 21/56* (2013.01)

(52) U.S. Cl.
  CPC .......... *H04L 63/1416* (2013.01); *H04L 63/145* (2013.01); *G06F 21/552* (2013.01); *G06F 21/554* (2013.01); *G06F 21/566* (2013.01); *G06F 21/568* (2013.01); *G06F 2009/45587* (2013.01); *G06F 2221/2101* (2013.01)

(58) Field of Classification Search
  CPC ... H04L 63/145; G06F 21/566; G06F 21/568; G06F 21/552; G06F 21/554; G06F 2221/2101; G06F 2009/45587

USPC ........................................ 726/22–24; 713/188
See application file for complete search history.

(56) References Cited

U.S. PATENT DOCUMENTS

| | | | | |
|---|---|---|---|---|
| 7,093,239 | B1 * | 8/2006 | van der Made | 717/135 |
| 7,594,009 | B2 * | 9/2009 | Triulzi et al. | 709/224 |
| 8,006,305 | B2 * | 8/2011 | Aziz | 726/24 |
| 8,918,879 | B1 * | 12/2014 | Li et al. | 726/24 |
| 2013/0347111 | A1 * | 12/2013 | Karta et al. | 726/23 |

* cited by examiner

*Primary Examiner* — Samson Lemma
(74) *Attorney, Agent, or Firm* — Beyer Law Group LLP

(57) ABSTRACT

A computer executes a suspicious software sample directly on its CPU in order to detect if the software sample is malicious. The software sample does not execute within a sandbox or virtual machine. Before the sample executes, a memory state of the computer is saved and a virtual disk file is created to bootstrap the computer at a later time. Malicious behavior of the software sample is collected while it executes and a report is generated. Hard disk access requests are redirected to a virtual disk file. The software sample does not detect that it is being analyzed. After execution of the sample, the computer is reverts to a clean state by bootstrapping the computer from the saved virtual disk file and then restoring the computer's volatile and non-volatile virtual memory from the saved memory state. A new software sample may then be executed and analyzed on the clean computer.

5 Claims, 8 Drawing Sheets

Detection System

Detection System

Detection System

MIS Functionality

DIS Functionality

Operation Example

Detect Malicious Behavior

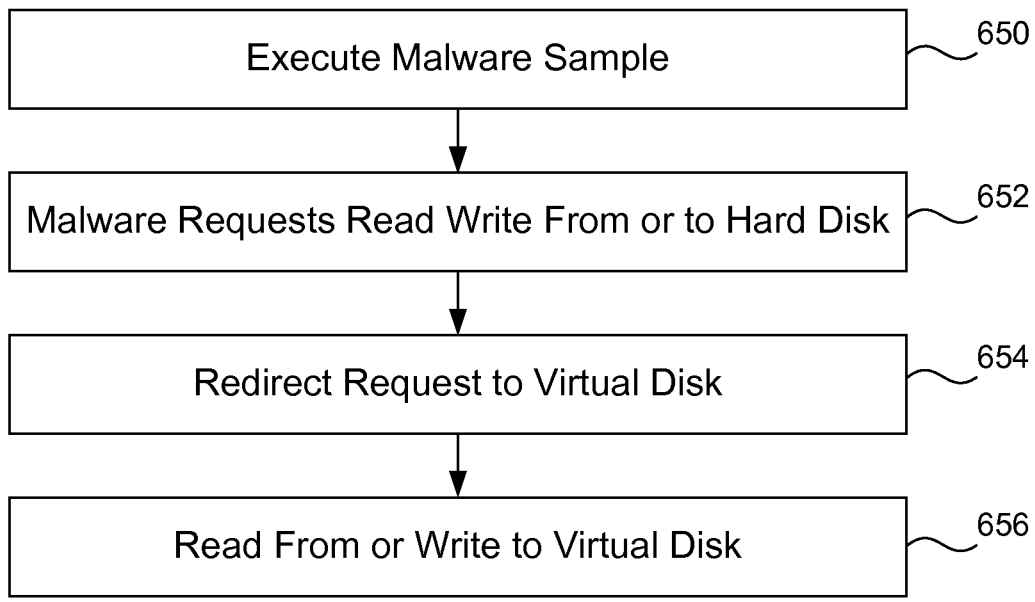
FIG. 6B  Step 620
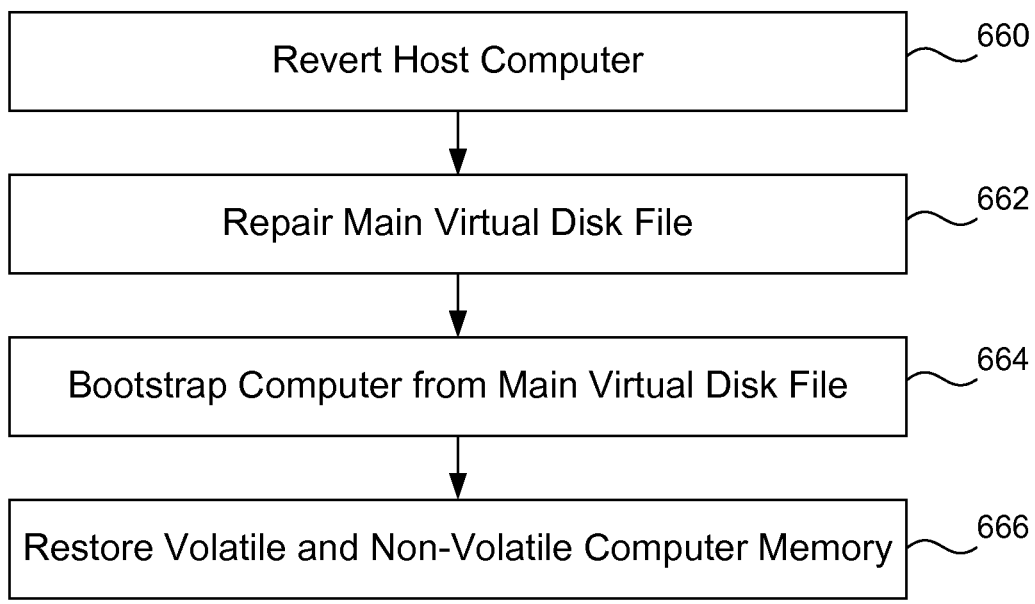
FIG. 6C  Step 632

DETECTION OF ADVANCED PERSISTENT THREAT HAVING EVASION TECHNOLOGY

FIELD OF THE INVENTION

The present invention relates generally to detection of malware on a computer. More specifically, the present invention detects malware that uses evasion technology to detect a virtual machine.

BACKGROUND OF THE INVENTION

Attacks upon computer systems are increasingly becoming more sophisticated and targeted. One particular type of threat, known as an advanced persistent threat (APT), refers to targeted attacks that aggressively pursue and compromise chosen targets, and is commonly associated with a government or other entity that has the resources to maintain such an attack. Often, such a long-term pattern of attacks is aimed at other governments or companies. Individuals are usually not referred to as being an advanced persistent threat because they rarely have the resources to launch a sophisticated attack or to be persistent. An advanced persistent threat is characterized by: targeting a specific organization or individual; accessing the target network; deploying additional tools; and covering tracks in order to maintain future access.

A sandbox is a security mechanism for separating programs on a computer and is often used to detect advanced persistent threats, as well as other malware. A sandbox typically provides a tightly controlled set of resources for guest programs to run in, such as scratch space on disk and memory. Network access, the ability to inspect the host system or the ability to read from input devices is usually disallowed or heavily restricted. Sandboxes include virtual machines that emulate a complete host computer on which a conventional guest operating system may boot and run as if on actual hardware. The guest operating system runs "in a sandbox" in the sense that it does not execute natively on the host computer and can only access host resources through the virtual machine. Sandboxes are used by antivirus service providers to analyze malware behavior; by creating an environment that mimics an actual computer, researchers can determine how malware infects and compromises a computer.

Traditionally, anti-APT software is deployed on a gateway computer where the software executes malware and collects its behavior within a sandbox such as the Multi-Vector Virtual Execution (MVX) product available from FireEye, Inc. Unfortunately, APT malware is becoming more sophisticated and now includes sandbox evasion technology that allows the malware to avoid exhibiting malicious behavior when in a traditional sandbox environment. For example, some APT malware now use technology that can detect traces of a virtual machine environment. Once the malware detects a virtual machine, it ceases exhibiting its malicious behavior, or simply exits, so that the sandbox cannot collect any information. For example, the malware checks for the existence of system files, registry keys, services, BIOS configurations, CLSID or even backdoor instructions associated with a virtual machine. Even more advanced, the malware can compare the difference in instruction block CPU execution cycles between a virtual machine and the host operating system. Malware can usually always detect a sandbox implemented using a virtual machine.

Other types of sandboxes can also be detected by APT malware. For example, in a sandbox, many hardware devices are emulated by software. Because of this emulation, the performance of the sandbox system will see a drop in performance due to the overhead of emulation and the accumulation of trace and trap handling during execution of malware samples. APT malware can often detect this performance drop.

Accordingly, because of the advanced evasion technology used by APT malware, new techniques are desirable that can collect behavior of and detect APT malware.

SUMMARY OF THE INVENTION

To achieve the foregoing, and in accordance with the purpose of the present invention, a detection system and associated techniques are disclosed that can execute APT malware and collect its behavior.

In a first embodiment, a suspicious file is received on a host computer and executes directly on the CPU of the host, not within a virtual machine. If the suspicious file performs a test to determine whether it is executing within a virtual machine it will conclude no, and will thus continue executing and exhibiting malicious behavior. The host computer then collects and records this malicious behavior and generates a report indicating the type of malware and other characteristics.

In a second embodiment, a suspicious file is received on a host computer and executes directly on the CPU of the host, not within a virtual machine. When the suspicious file attempts to write to a particular sector on the hard disk that request is redirected to a special file on the hard disk that is under control of the monitoring program. The suspicious file is not allowed to modify or read from the particular sectors on disk that it requests. The host computer collects and records malicious behavior exhibited by the suspicious file and generates a report indicating the type of malware and other characteristics.

In a third embodiment, a suspicious file is received on a host computer and executes directly on the CPU of the host, not within a virtual machine. Before the suspicious file is executed, all of the files, records, data and registries needed to bootstrap and run the host computer (including any operating system files) are saved into a special file on disk. The executing suspicious file will not be able to modify this special file. The host computer then collects and records this malicious behavior and generates a report indicating the type of malware and other characteristics. When the host computer is rebooted, it can reboot from the special file on hard disk and be assured of starting up free of any malware infection. In addition, the memory state of the volatile memory of the computer may be saved into another special file on disk before the suspicious file is executed. After bootstrapping, the volatile memory can be restored from this special file.

BRIEF DESCRIPTION OF THE DRAWINGS

The invention, together with further advantages thereof, may best be understood by reference to the following description taken in conjunction with the accompanying drawings in which:

FIG. 6B describes in more detail step 620 of FIG. 6A.

FIG. 6C described in more detail step 632 of FIG. 6A.

DETAILED DESCRIPTION OF THE INVENTION

Detection System Block Diagram

Figure 1:
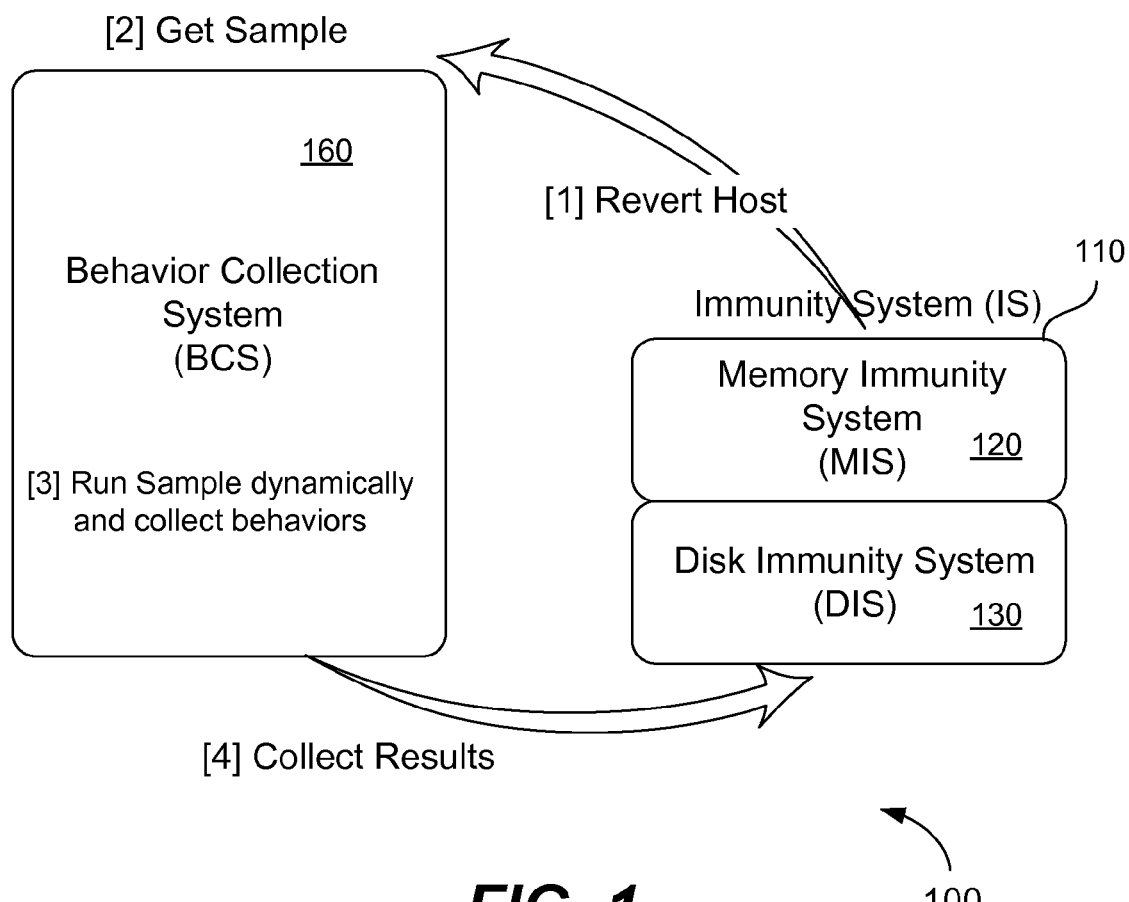
FIG. 1 is a block diagram of a detection system showing the architecture and overall workflow of the invention.

FIG. 1 is a block diagram of a detection system 100 showing the architecture and overall workflow of the invention. System 100 is capable of being implemented on a variety of computers and operating systems, such as computers running both server and end-user versions of the Microsoft operating system, including versions XP SP3, 2003, Vista and 7.

In general, the detection system includes an immunity system (IS) software module 110 and a behavior collection system (BCS) software module 160. The IS module includes both a memory immunity system (MIS) module 120 and a disk immunity system (DIS) module 130. Both modules are preferably stored on the host computer, the BCS being stored in a file on disk and being able to execute at runtime when launched by the IS module. The IS module also resides on the disk of the host computer and in general is used to bootstrap the computer and revert the host machine to an initial state.

At a high level, operation of the invention is as follows. In step 1, the IS module reverts the host machine to an initial state, including all non-volatile media (e.g., the hard disk, flash memory, and so forth), and any volatile memory. By initial state, we refer to a state in which no malware is present on the host computer, meaning that there are no infected portions of the disk, of memory, of any registries, etc. It is a state in which a user of the computer can confidently use the computer knowing that no malicious behaviors will take place that would cause harm to the user, to the computer or to data on the computer. Placing the host machine into a known, initial state not only prepares the machine for immediate execution of any programs, but also ensures that the host machine will not be infected by malware as it begins executing, and ensures that collection of behaviors will be accurate.

In step 2, the BCS module retrieves a malware sample to prepare it for execution. In step 3, the BCS launches the malware sample, scans its code, and collects its dynamic behaviors on the host machine. Because the malware sample is actually executing on the host machine, any potential evasion technology used by the malware will not find the existence of any sandbox, and the malware will thus continue exhibiting its malicious behavior. In step 4, the BCS module collects any results obtained for a final report, and signals the IS module to revert the host machine to be ready for the next malware sample.

Detection System Detail

Figure 2:
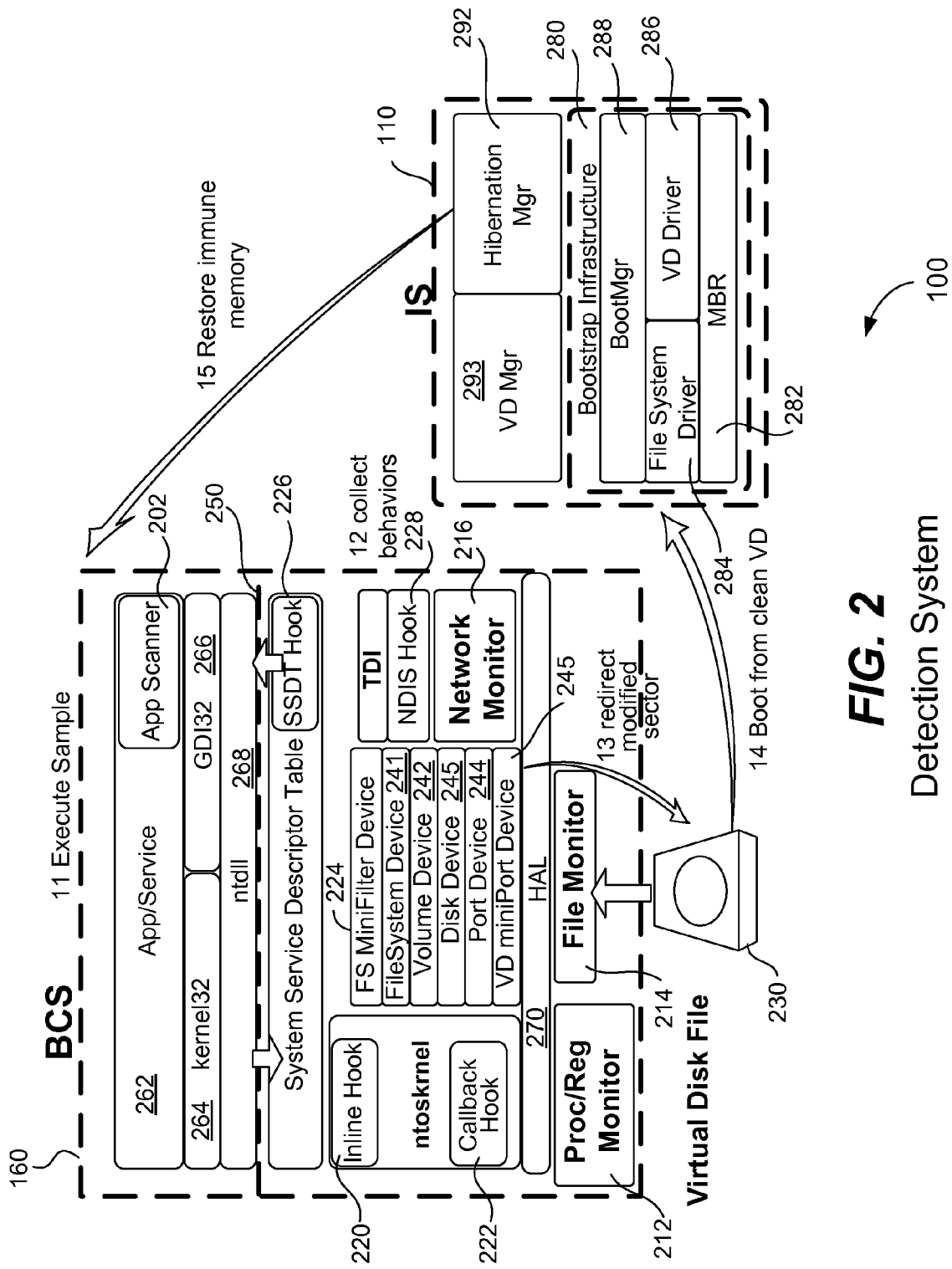
FIG. 2 is a more detailed block diagram of detection system.

FIG. 2 is a more detailed block diagram of detection system 100. As mentioned, the detection system is comprised mainly of IS module 110 and BCS module 160. The BCS module is mainly used to execute the malware sample, to collect its dynamic behaviors in a run-time environment, and to redirect disk access requests from the malware sample. Some portions of the BCS module are similar to traditional sandboxes, while other portions are novel. Application scanner 202 is a software module that controls the entire collection session within the BCS module and also is able to scan all static information in user mode. Thus, both traditional static property analysis (signature analysis) and dynamic behavior collection are implemented in the application scanner which also generates the final report and sends it out after the sample execution is done.

A variety of monitors within the BCS module intercept and filter relevant behavior of the malware sample while it is executing and include a process monitor and a registry monitor 212, a file access monitor 214, file system mini-filter device 224, and a network monitor 216. In order to collect more information from the malware sample, these monitors are typically implemented in kernel mode and include hooks such as in-line hook 220, callback hook 222, SSDT hook 226, and NDIS hook 228.

One important difference between the present invention and a traditional sandbox is the use of virtual disk files and access redirection technology. It is realized that any infection or modification caused by execution of a malware sample must be detected and discarded before the next malware sample is executed. Virtual disk file 230 represents any number of virtual disk files that are files stored on the hard disk of the host computer. These are termed "virtual disk" files in that while the malware sample believes it is directly reading from and writing to sectors on the hard disk, the malware sample is actually interacting with one of these files on the hard disk through the use of the redirection technology. Thus, even though the malware sample may eventually read from or write to a file on the hard disk, it cannot directly access particular sectors on the hard disk that it would like to access. Typically, the virtual disk files can be formatted as a .VDI file (for Virtualbox), a .VMDK file (for VMware), a .VHD file (for virtualPC), or any other suitable type of file.

Even though the host computer will revert and bootstrap itself using the main virtual disk file (which has been saved in a known clean state), it is necessary to redirect disk access requests from the malware. If the malware were allowed to write to particular sectors on disk, it might infect certain areas such as the MBR, the kernel driver module, or the auto-run registry key. Infection in these areas on disk might not only interfere with execution of the next sample malware, but also taint the results of behavior collection of the current sample. Redirecting malware write requests ensures that the system can continue to execute and collect behavior of multiple malware samples.

In one embodiment, virtual disk file 230 includes a main virtual disk file 460, and a redirect virtual disk file 470. A backup virtual disk file 480 is also used and these will be described in more detail below with reference to FIG. 4. The main virtual disk file 460 includes all the content needed by the host machine to support its operation. For example, the main virtual disk file includes the Master Boot Record (MBR), system kernel file, all supporting driver files (VGA, keyboard, mouse, file system, etc.), registry file and all other system files and necessary data. The main virtual disk file is essentially a copy of these operation files on the hard disk but with its own content format. The redirect virtual disk file 470 serves as a write access sink for the virtual disk redirector in order to redirect the malware sample's write requests. The backup virtual disk file 480 is a clean copy of the main virtual disk file.

As mentioned, the malware sample will execute directly on the host machine and not within a virtual environment, such as within a sandbox or within an emulator. Because of this, it is certainly possible that an executing malware sample will attempt to infect the non-volatile storage media of the host computer such as the hard disk, flash memory, USB devices, and so forth.

In order to avoid problems running the next malware sample because of infection caused by the current malware sample (and to avoid problems collecting behaviors from a current sample), a virtual disk redirector module is used. In one embodiment, the virtual disk redirector may be implemented using file system mini filter device 224. Typically, the driver device stack is used to manage specific I/O functions and every device is responsible for handling its own level. In one embodiment, the disk storage device stack is implemented using devices 224 and 241-245. The file system mini-filter device 224 is a file granularity access filter based upon the file system device and is used to filter read and write requests. The file system device 241 is for a normal file read, write or open such as NTFS or FAT32. The volume manager device 242 manages hard disk volumes installed on the host operating system. The disk partition device 243 is responsible for disk partition access and control such as C:\, D:\, and so forth. The port driver device 244 is used for different bus management attached to storage devices such as IDE and SCSI. And, mini-port driver device such as device 245 is used for specific storage device I/O access management, such as recognizing the format of the virtual disk. Other relevant portions of the BCS module include a division 250 between kernel mode and user mode space, an application or service layer 262 that provides fundamental services and functions for sample execution, a kernel32 264, a GDI32 266, and an ntdll layer 268. HAL 270 is a hardware abstraction layer.

In one embodiment, the virtual disk redirector module is attached to the current storage device stack at the mini-filter driver level which is used to manage the disk sector access requests. When a disk write request is received from the malware sample, it will redirect the sector write to the virtual disk file in order to avoid writing to a requested sector of the disk which might infect the disk. For example, when a malware disk write request is received in the virtual disk redirector module 224, it will retrieve the requested sector array information from the IRP (I/O Request Packets) structure at the current stack location and the sector's layout information from the file system (e.g., NTFS, FAT32 and so forth), repack the request with redirected sector array, and then route the request down to the next level if the current process belongs to the sample malware. The VD mini-port driver 245 will allocate the requested sectors on hard disk according to the specialized virtual disk format (e.g., VHD) after the repacked request is received. The only modification to the normal operating environment is this redirection of disk access requests to the virtual disk. Because such a file system filter is so common in a Microsoft operating system it will not be recognized by malware as a distinct signature of a sandbox. Thus, APT malware will not notice the presence of this redirection technique.

The IS module 110 is used to revert the host machine to an initial state—discarding all modifications made by the previous malware sample—and to restart the BCS module. Preferably, the initial state is free of infection by malware, meaning that the host machine is free of infection in both the non-volatile storage media and in the volatile storage media. The IS module 110 is independent of the BCS module 160 and may be implemented in various manners such as: in a second operating system on another partition of the host computer; on a startup USB drive or on a CD-ROM; as a configuration or a replacement of the original host operating system; or, by bootstrapping from a portable operating system such as from WinPE.

The IS module 110 is comprised of three basic functionalities which include the bootstrap infrastructure 280, the memory immunity system 120 and the disk immunity system 130. Bootstrap infrastructure 280 not only bootstraps the host computer but also provides the infrastructure interface for the MIS and DIS functions. MBR 282 is a disk sector loaded into memory and executed after the BIOS is called and is mainly for CPU mode and environment initialization and for loading more components. The file system driver 284 and the virtual disk driver 286 are used to provide virtual disk format recognition, sector read/write functionality, recognition of the file system stored on the virtual disk file, and reading/writing of files. The bootstrap manager 288 is used for bootstrapping other components during operating system startup. Hibernation manager 292 is a software module that manages the functionality of the memory immunity system 120 as described below. Virtual disk manager 293 is a software module that manages the functionality of the disk immunity system 130 as described below.

Steps 11-15 provide an overall workflow. In step 11, the BCS module executes a new malware sample. In step 12 the monitors of this module collect the behaviors of the malware sample as it executes on the host computer as described above and prepares a report. In step 13 any request by the malware sample to modify (or read from) a sector on the hard disk (or other non-volatile storage of the host computer) is redirected to the virtual disk file 230. Once the malware sample has finished executing, in step 14 the host computer is bootstrapped using virtual disk file 230. In step 15 the memory (which is immune from infection by the malware) is restored.

Figure 3:
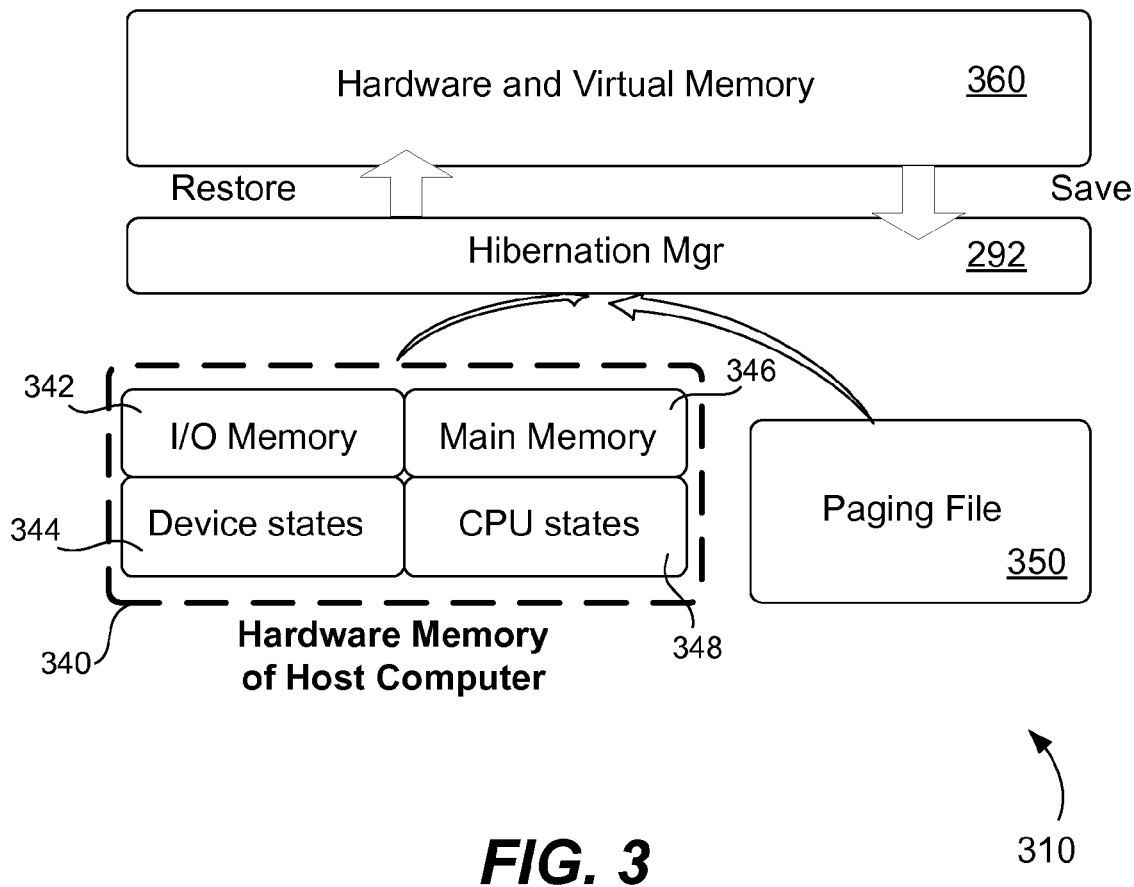
FIG. 3 is a block diagram of the functionality 310 of the memory immunity system (MIS).

FIG. 3 is a block diagram of the functionality 310 of the memory immunity system (MIS) 120. As mentioned, the memory immunity system is responsible for saving and then later restoring the memory state of the host computer. By saving the memory when it is in a known, good state (free of infection from malware), it can later be restored without worry that the memory is infected. The memory 360 of the host computer that may be saved includes hardware memory 340 as well as virtual memory 350. The hardware memory refers to the volatile memory which typically includes I/O memory 342, device states 344 (e.g., physical memory/port space and registrars of devices), main memory 346, and CPU states 348.

The paging file 350 refers to non-volatile virtual memory under a Microsoft operating system. For example, a paging file is often used on disk for implementing virtual memory. In general, non-volatile virtual memory 350 refers to that virtual memory space on the hard disk that the immunity system will save.

The memory state of the host computer is typically saved when the host computer first starts up. When this occurs, the entire memory state as described above is saved on the hard disk of the host computer as a file. In one embodiment, the Microsoft Hibernation mechanism may be used in which the Hibernation Manager 292 saves the system memory into a "hibernation.docx" file. In another embodiment, the Golden Memory technology is used to store the system memory onto a file on the hard disk. When it is time to revert the host computer, the memory state is restored from any one of these files on the hard disk. The Golden Memory technology is similar to the snapshot mechanism adopted by almost all popular virtual machine manufacturers and products, e.g., VMware workstation, Oracle Virtual Box, and so forth. By saving and later restoring all volatile and non-volatile space of a guest operating system, it is much easier to handle a case replay (e.g., catch, replay and debug for random occurrence crashes, sandbox automatic revert, and so forth) and VM migration.

In order to increase the performance of saving and restoring the system memory a variety of acceleration methods may optionally be used. For example, both the hardware memory and the paging file may be cached in high-speed storage such as on a solid-state disk or a flash disk. Because the hardware memory and the paging file may include massive amounts of data, caching of this data will result in a speed increase. In another example, part of the physical memory of the host computer is reserved to save the hardware memory so that no disk input/output is needed during a restore operation.

Figure 4:
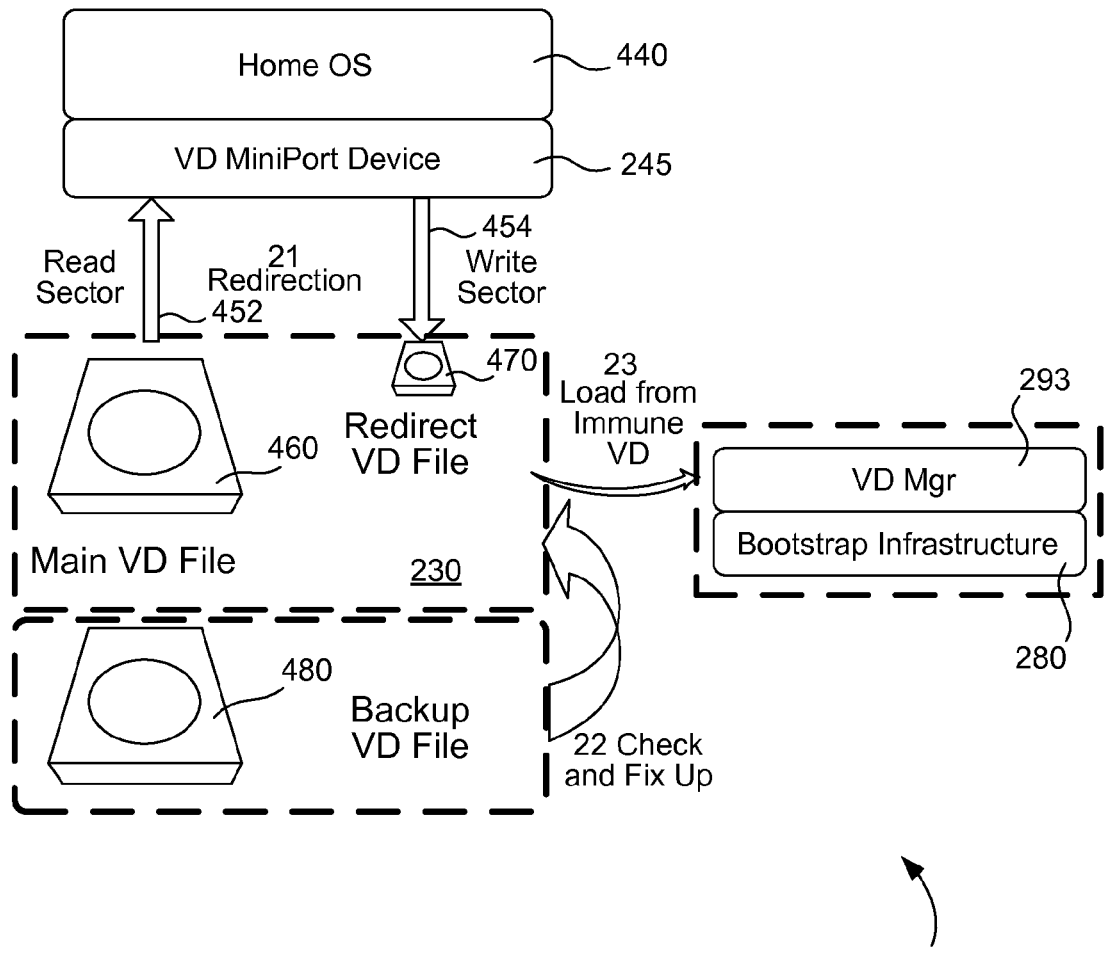
FIG. 4 is a block diagram of the functionality 410 of the disk immunity system (DIS).

FIG. 4 is a block diagram of the functionality 410 of the disk immunity system (DIS) 130. As mentioned, the disk immunity system is responsible for keeping the hard disk of the host computer free of infection. During execution of a malware sample, the operating system of the host computer 440 reads from 452 and writes to 454 sectors on the virtual disk via virtual disk mini-port device 245. Mini-filter 224 is to intercept and repack the read/write requests at the file level from a malware process. Miniport device 245 is used to access and operate the hard disk at the sector level according to a specialized format. Redirection includes both redirecting the read/write request and accessing the specialized format virtual disk.

The functionality includes a main virtual disk file 460 which contains all of the operating system files that the host computer needs to bootstrap itself and to run the system. Basically, the contents of the main virtual disk file may include: runtime execution environment support (e.g., operating system bootstrap-related components such as the System Hive, the MBR, and bootable drivers); operating system kernel; all kinds of I/O drivers (e.g., hard disk, network, and so forth); critical service and system applications (e.g., svchost and csrss); and the supported registry hive.

The redirect virtual disk file 470 is used to receive write sector access requests by the executing malware sample; as mentioned, the virtual disk redirector module redirects write requests to this file 470 rather than letting the malware sample directly write to any sector on disk that it wishes. After the current malware sample finishes executing, any modifications it has made to non-volatile media (such as the hard disk), or rather, any modifications it thinks it has made to non-volatile media, will be present within file 470. In this fashion, the invention prevents the malware from changing particular sectors on desk.

The backup virtual disk file 480 is used to handle certain types of malware, such as a rootkit in kernel mode. In principle, any request by executing malware to modify non-volatile media (such as request 454) will be redirected to the redirect virtual disk file 470; however, some rootkit malware may be able to evade the redirector module and will infect the main virtual disk file 460. In order to address this potential problem, a backup virtual disk file 480 is generated after system startup (and before any malware is executed on the host computer) by making a copy of main virtual disk file 460. Therefore, whenever the virtual disk manager 293 gains control during a bootstrap operation (because the host computer is reverting) it will check the integrity of the main virtual disk file 460 (e.g., using an MD5, SHA-1, etc.) and if a difference is found, it will repair the main virtual disk file 460 using the backup virtual disk file 480. The host computer will then be rebooted from the repaired main virtual disk file 460. The backup virtual disk file 480 is used to fix any unexpected modifications made to the main virtual disk file by the malware. Thus, the main functions of the disk immunity system are use of redirection 21, checking and repairing the main virtual disk file 22, and loading the operating system from a clean main virtual disk file 23.

Redirection 21 refers to actions by the redirector module to redirect both read requests and write requests from the malware sample. When the malware sample attempts to read a particular sector from the hard disk, it is actually reading information from either the main virtual disk file 460 or the redirect virtual disk file 470, and, when the malware sample attempts to write to a particular sector on the hard disk, is actually writing information to the redirect virtual disk file 470. The malware sample is unaware that it is accessing a virtual disk file rather than the particular sectors on hard disk that it desires to access. In one embodiment, the malware sample is unaware of the virtual disk files because it only sees the entire sector space from 0 up to N, the maximum number of sectors. When the malware reads from or writes to a particular sector, this request is mapped by the redirector module to either the main virtual disk file or to the redirect virtual disk file.

When a revert is called for and the immunity system wishes to bootstrap the host computer, the virtual disk manager 293 first checks and repairs 22 the main virtual disk file using the backup virtual disk file, and then loads 23 relevant files and data from the main virtual disk file 460 in order to bootstrap the host computer.

Operation Example

Figure 5:
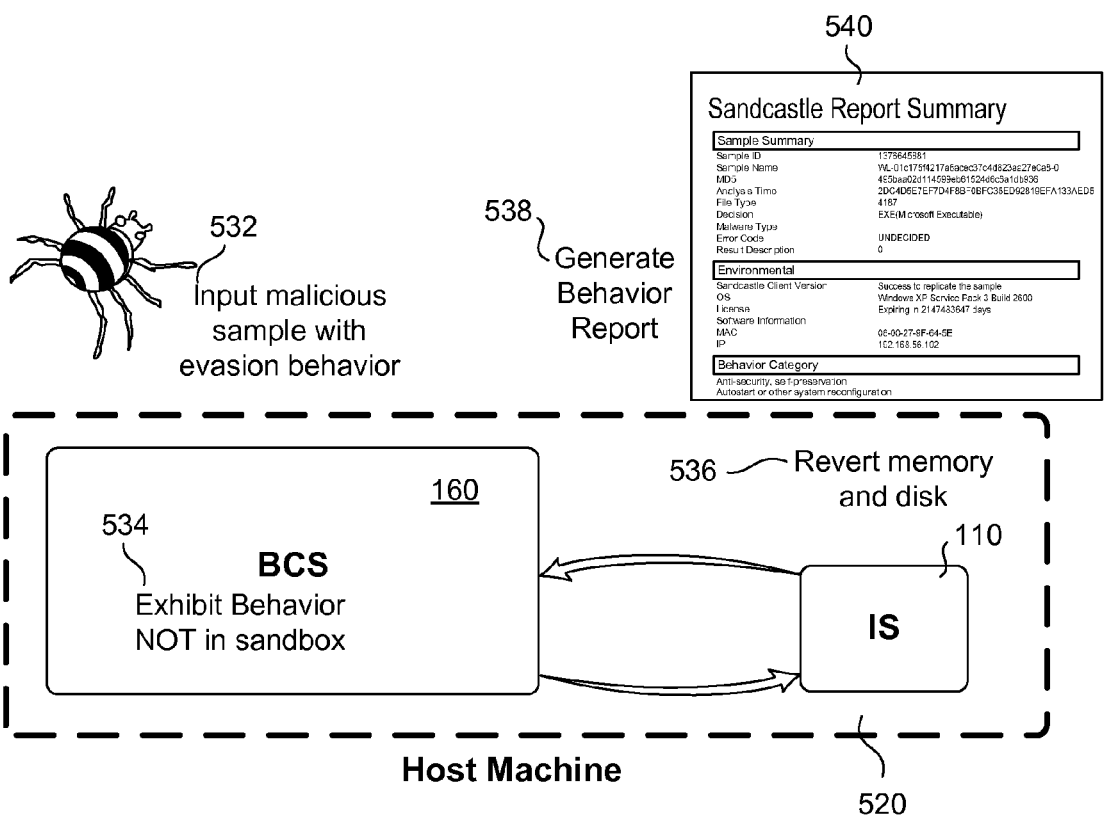
FIG. 5 illustrates one example of operation of the invention.

FIG. 5 illustrates one example of operation of the invention. For example, assume that a malware sample is input 532 into the host computer, such as an APT malware including evasion technology. In this example, the malware sample has been packed with a complex packer, and, during the packer execution it first checks for evidence of a virtual machine, emulator, sandbox, etc. Typically, the malware will execute a specific instruction and if the execution time of that instruction is more than a specific threshold then the malware will assume that it is operating within a virtual machine, emulator or sandbox, and will exit before exhibiting any detectable malicious behavior. If the malware does not detect a lengthy execution time, it will download a malicious portion (or other similar action) and will inject malicious software into "iexplorer.exe" (for example) in order to surreptitiously obtain account information, passwords, financial information, etc. Thus, when operating within a traditional sandbox no relevant malicious behavior can be collected because the malware will detect the existence of the sandbox and will exit or perform other benign actions.

Using the present invention, however, the malware will continue to execute and will exhibit its malicious behavior 534 because it is not executing within a virtual machine, emulator or sandbox. Further, the operating system of the host computer is not emulating any hardware devices using software (or other processes of a virtual machine), thus the performance of the operating system is normal and the malware cannot detect any degradation in system performance. Once the behavior of the malware sample has been collected, the immunity system 110 may be used to revert the memory and hard disk of the computer 536. In addition, a behavior report 540 for the malware sample is generated 538. This report includes information such: as the unique identifier for the sample and its name; its MD5; file properties (e.g., packing information, execution type, Java type or script type such as Flash, JavaScript, VB Script, or Word Macro); a decision or result; malware type (family category); error and warning logs during execution; operating system; and behavior category (including malicious network connect, download or dropped executable files, auto-run related registry keys, duplicate and self deletion, critical memory activities such as service install, driver load, dll injection, heap spray, exploit execution, hijack explorer.exe or shutdown antivirus, etc.).

Flow Diagrams

Figure 6A:
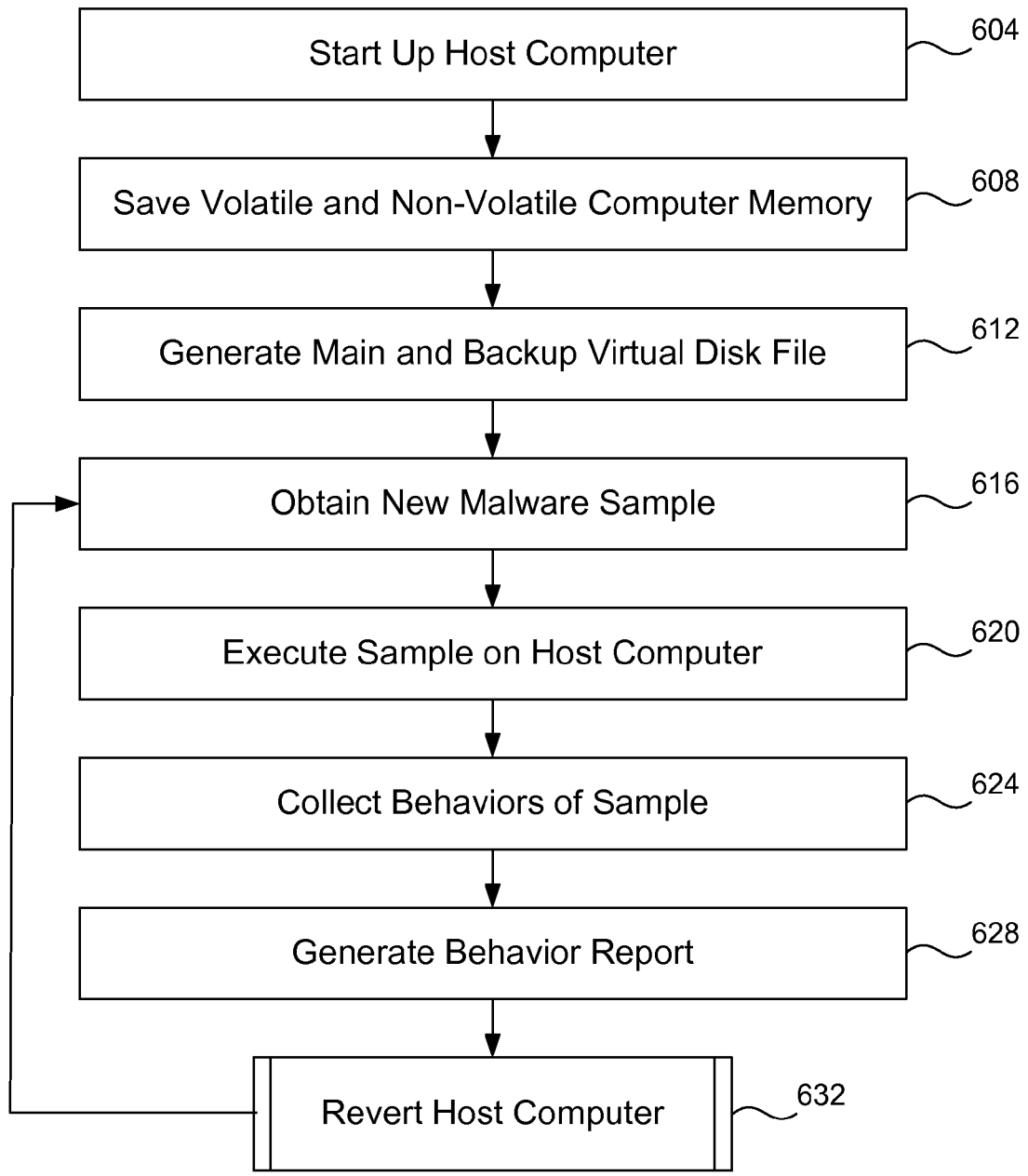
FIG. 6A is a flow diagram describing one embodiment by which a host computer detects malicious behavior of malware.

FIG. 6A is a flow diagram describing one embodiment by which a host computer detects malicious behavior of malware. In a first step 604 the host computer is turned on, it bootstraps itself, and begins operating. At this point, the host computer is known to be free of malware such as any infected disk, files, registry, etc. (due to using any of a number of techniques such as previous scanning, malware cleaning, repair of infected files, etc.). Accordingly, in a next step 608 the memory immunity system 120 saves the volatile and non-volatile computer memory to a file on the hard disk as explained with respect to FIG. 3. As previously mentioned, this saved memory state includes hardware memory and any virtual memory on the hard disk. Because the host computer is in a known, clean state, this saved memory state is free of any malware infection. Next, in step 612 the disk immunity system 130 generates both a main and a backup virtual disk file as explained with respect to FIG. 4. Again, because the host computer is in a clean state, the main virtual disk file will be free of malware. At this point in time, the backup virtual disk file 480 is generated by simply copying the main virtual disk file. Preferably, both steps 608 and 612 are performed before any known malware sample is obtained by the host computer, and before the host computer performs any communication that might subject it to a malware infection.

In step 616 the BCS module begins execution and obtains a new software sample. This software sample may be obtained from over a network connection (wireless or wired), downloaded from the Internet, uploaded from a USB drive, mobile telephone, or other similar computing device, or may be introduced in some similar fashion. The software sample may be benign or malicious. Typically, the software sample is suspected of being malware, and in particular is suspected of being APT malware that uses evasion technology (i.e., the evasion technology detects that the malware is being analyzed and causes the malware to exit). Although the present invention is capable of determining that a benign file does not exhibit malicious behavior, and can determine that a typical malicious file is in fact malware (i.e., a malicious file that does not use evasion technology), the present invention is especially suited for malware that uses evasion technology that detects when it is operating within a sandbox (or other virtual machine) or when software emulation of hardware devices is being used.

In step 620 the BCS module executes the sample software on the host computer. This software sample is not executing within a sandbox or other virtual machine, its instructions are being executed directly on the CPU of the host computer. Further, because the file system mini filter device 224 (which is responsible for the redirection of the software sample's access requests) is a generic mechanism, the software sample cannot detect that its requests are being redirected. In step 624 as the software sample executes it will exhibit various behaviors (both benign and malicious) that are collected by the various monitors and hooks described in FIG. 2. In one embodiment, these monitors and hooks only collect malicious behavior of the software sample that indicates that the sample is malicious. Because the software sample is not executing within a sandbox or virtual machine, and because other emulation is not used, if the software sample is APT malware it will not be able to use its evasion technology to exit or to otherwise terminate its malicious behavior in order to avoid detection. In step 628 the BCS module generates a behavior report such as the report 540 shown and described in FIG. 5. Finally, in step 632 the immunity system reverts the host computer back to an initial state. The revert may be triggered by a signal from the BCS module or by action such as the generation of the behavior report. Because the host computer may have been infected by malware during execution of the software sample (due to the malware not being executed within a sandbox), reverting the host computer to a known, clean state ensures that the next software sample may be run in a clean state.

FIG. 6B describes in more detail step 620 of FIG. 6A. In step 650 the malware sample continues its execution. At some point, in step 652 the malware sample requests either to read from the hard disk of the host computer or to write to the hard disk. Even though the malware sample would like to write to a particular sector on the hard disk, it will be prevented from writing to that sector, and will be prevented from writing to the hard disk directly, via the redirector module previously described. Further, because some malware will write to a particular sector and then immediately perform a read of that same sector to determine if the write was actually successful, the redirector module will also redirect any sector reads from the malware. In this fashion, the malware is not only prevented from modifying critical sectors of the hard disk, but also it is led to believe that it can actually modify particular sectors of the hard disk. In step 654 the redirector module redirects any hard disk write requests to the redirect virtual disk file 470, and redirects any hard disk read requests from the malware to either the main virtual disk file 460 or the redirect virtual disk file 470 (depending on the sector requested). Finally, in step 656 the malware sample is allowed to either read from or write to virtual disk 230.

FIG. 6C described in more detail step 632 of FIG. 6A. In step 662 the disk immunity system as shown in FIG. 4 repairs the main virtual disk file 460 using the backup virtual disk file 480 if necessary. Because the main virtual disk file will be used to bootstrap the host computer (instead of using the hard disk itself which might have become infected), and because the main virtual disk file might have become infected itself, the known clean backup virtual disk file can be used to repair the main virtual disk file. For example, any suitable hash algorithm may be used to obtain a hash value of the main virtual disk file when it is first generated. In step 662, if this hash value is now different, then the main virtual disk file may be replaced by the backup virtual disk file. Or, portions of the main virtual disk file may be repaired using corresponding portions from the backup virtual disk file. For example, we verify the integrity according to files or directories of the main virtual disk recursively from its root to the leaves. We first check the hash of the whole C:\ drive, if correct, the checking process is over; otherwise we check C:\Windows, C:\Users recursively until the infected leaf files are found.

Once it has been determined that the main virtual disk file is the same one generated in step 612, then in step 664 the disk immunity system bootstraps the host computer using the main virtual disk file. Once the computer has been bootstrapped and is operating, then in step 666 the memory immunity system restores the volatile and non-volatile computer memory that had been previously saved in step 608. Once these steps are complete, then the host computer has successfully reverted, and control returns to step 616 in which a new malware sample may be obtained for execution and analysis.

Computer System Embodiment

Figure 7A:
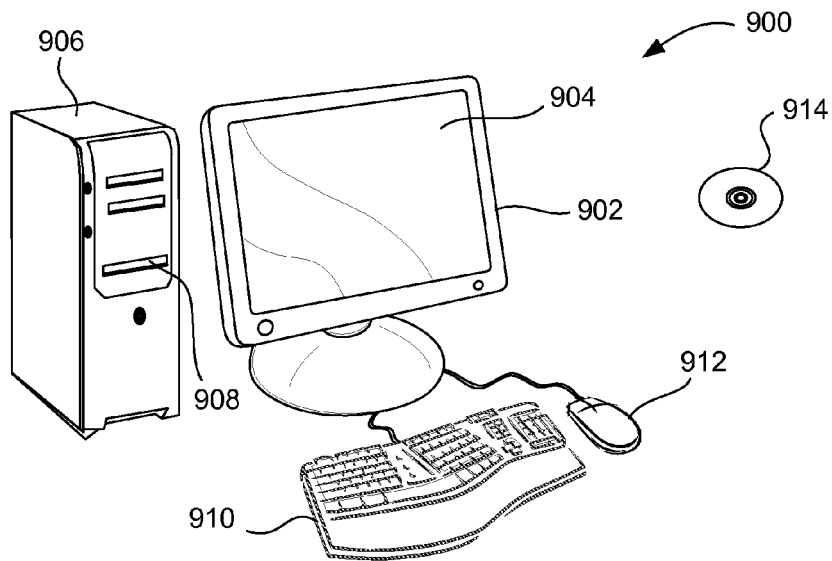
FIGS. 7A and 7B illustrate a computer system suitable for implementing embodiments of the present invention.
Figure 7B:
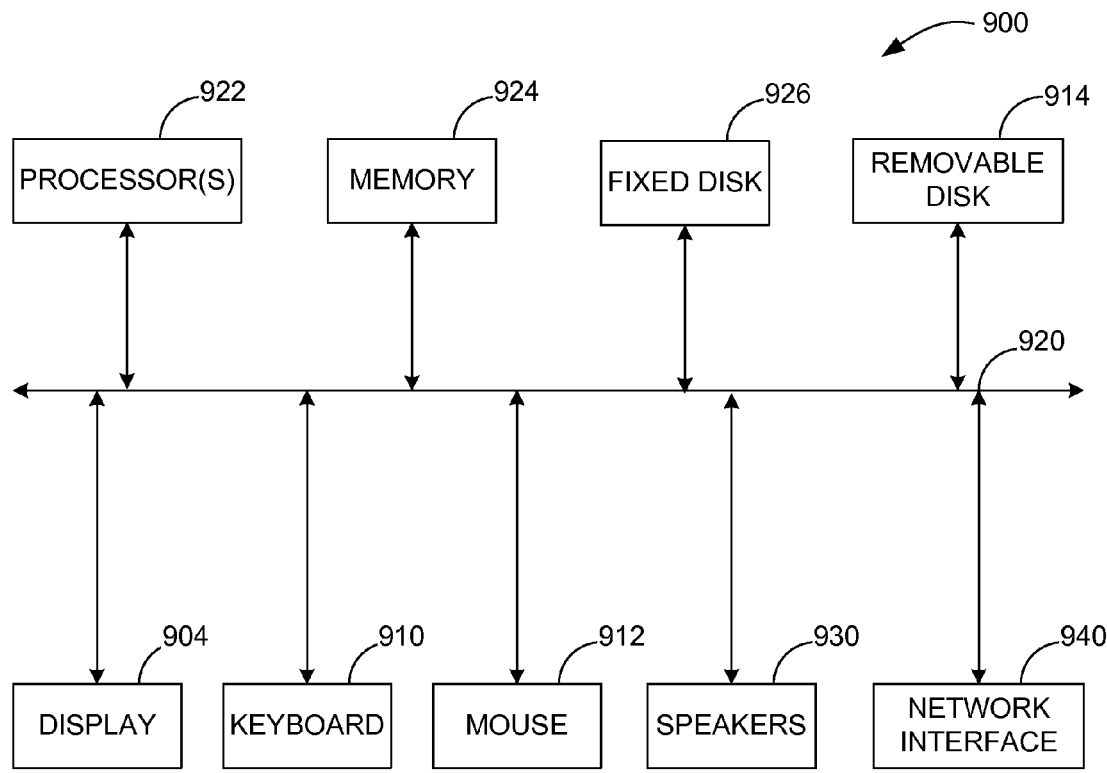

FIGS. 7A and 7B illustrate a computer system 900 suitable for implementing embodiments of the present invention. FIG.

7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting malicious software, said method comprising:
   receiving a suspicious file in a host computer, said suspicious file suspected of being malware;
   before receiving said suspicious file, saving volatile memory of said host computer in a first file of mass storage of said host computer;
   before receiving said suspicious file, saving bootstrapping components of said host computer into a second file of said mass storage, said bootstrapping components including information necessary to bootstrap and run said host computer, said second file of said mass storage being inaccessible to said suspicious file;
   executing said suspicious file directly on a CPU of said host computer, said suspicious file not being executed within a virtual machine;
   detecting malicious behavior of said executing suspicious file;
   recording said malicious behavior during said execution of said suspicious file; and
   generating a report using said recorded malicious behavior, said report indicating that said suspicious file is a particular type of malware.

2. The method as recited in claim 1 further comprising:
   after executing said suspicious file, bootstrapping said host computer from said second file of said mass storage.

3. The method as recited in claim 1 further comprising:
   after executing said suspicious file, restoring said volatile memory of said host computer using said first file of said mass storage.

4. The method as recited in claim 1 wherein said host computer is free of any malware infection before receiving said suspicious file.

5. The method as recited in claim 1 further comprising:
   performing said step of saving when said host computer is in a clean state free of any malware infection.

* * * * *